(12) United States Patent
Lettkeman et al.

(10) Patent No.: US 9,708,220 B2
(45) Date of Patent: Jul. 18, 2017

(54) CEMENTITIOUS PATCH COMPOSITIONS AND METHODS

(71) Applicant: United States Gypsum Company, Chicago, IL (US)

(72) Inventors: Dennis Mark Lettkeman, Watonga, OK (US); John Wesley Wilson, Fairview, OK (US); William Kelly Bedwell, Okeene, OK (US); Raymond A. Kaligian, Geneva, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 14 days.

(21) Appl. No.: 14/714,653

(22) Filed: May 18, 2015

(65) Prior Publication Data
US 2016/0340251 A1  Nov. 24, 2016

(51) Int. Cl.
*C04B 28/06* (2006.01)
*C04B 28/14* (2006.01)
C04B 111/00 (2006.01)
C04B 111/72 (2006.01)

(52) U.S. Cl.
CPC .............. *C04B 28/06* (2013.01); *C04B 28/14* (2013.01); *C04B 2111/00482* (2013.01); *C04B 2111/72* (2013.01)

(58) Field of Classification Search
CPC .......... C04B 28/06; C04B 28/04; C04B 28/14
See application file for complete search history.

(56) References Cited

U.S. PATENT DOCUMENTS

| | | | |
|---|---|---|---|
| 4,735,027 A | 4/1988 | Evans et al. | |
| 6,833,186 B2 | 12/2004 | Perrine et al. | |
| 8,343,273 B1 * | 1/2013 | Lettkeman | C04B 11/007 106/778 |
| 9,346,996 B1 * | 5/2016 | Lettkeman | C09K 8/46 |
| 2003/0055147 A1 * | 3/2003 | Lelli | C08K 3/34 524/442 |
| 2008/0182764 A1 * | 7/2008 | Xu | C04B 28/06 507/269 |
| 2013/0284069 A1 * | 10/2013 | Dubey | C04B 7/32 106/695 |

FOREIGN PATENT DOCUMENTS

DE  2129058  1/1973

* cited by examiner

*Primary Examiner* — Robert C Boyle
(74) *Attorney, Agent, or Firm* — Greer, Burns & Crain, Ltd.; Brian Wishnow; Philip T. Petti

(57) ABSTRACT

A cementitious hydrating patch composition is provided with improved strength and abrasion resistance. The patch comprises Portland cement in the amount from 2% to 10%, Calcium Sulfate Hemihydrate in the amount from 2% to 30%, Gypsum in the amount from 0% to 15%, Calcium Aluminate Cement in the amount from 15% to 40%, Calcium Carbonate in the amount from 0% to 40%, at least one filler in the amount from 1% to 30%; and at least one binder in the amount from 10% to 40%, wherein all amounts are based on dry weight of the composition. Methods of preparing and using the patch composition are provided as well.

10 Claims, No Drawings

CEMENTITIOUS PATCH COMPOSITIONS AND METHODS

FIELD OF THE INVENTION

This invention relates to cementitious compositions for patching walls, flooring and ceiling, and methods of using these patch compositions.

BACKGROUND

A patching formulation can be used for patching of plywood or concrete flooring, walls, ceilings, block materials and concrete plank. Cementitious patching materials are used for a broad spectrum of applications. The state of the art technology in this type of patches is Calcium Alumina Cement (CAC), sometimes referred to as High Alumina Cement formulations (HAC).

Formulations described in U.S. Pat. No. 6,833,186 provide an abrasion resistant coating composition comprising alumina and silica. DE 2129058 discloses mortar mixtures based on cement, sand additives for plastering floors. U.S. Pat. No. 4,735,027 provides coating formulations with silica sand, cement and a particulate, non-fibrous filler.

Various parameters must be considered in choosing a patch formulation. Preferably, a patch formulation should adhere well to a surface over which it is applied. It is also important that after the patch sets, it should be easy to sand the patch surface and prepare it for receiving a coat of paint.

Many patch formulations currently available on the market harden by evaporating water. This may lead to cracking, loose fit and eventual dislodging of the patch from surface to which it is adhered.

There is a need for patching materials which are easier to trowel, have higher extensions in addition to being high-strength and self-drying. There is also a need for improvement of re-workability of patch products and longer pot life; so that patching materials can be applied with less waste and larger volumes can be made for deeper applications and/or larger areas.

SUMMARY

This and other needs are at least partially addressed by hydrating patch compositions provided by this invention. Some embodiments include a hydrating patch composition comprising: Portland cement in the amount from 2% to 10%, Calcium Sulfate Hemihydrate in the amount from 2% to 30%, Gypsum in the amount from 0% to 15%, Calcium Aluminate Cement in the amount from 15% to 40%, Calcium Carbonate in the amount from 0% to 40%, at least one filler in the amount from 1% to 30%; and at least one binder in the amount from 10% to 40%, wherein all amounts are based on dry weight of the composition. At least in some of the embodiments, calcium sulfate hemihydrate is calcined synthetic gypsum spray-coated with diethylene-triamine-pentaacetic acid (DTPA). Various fillers can be used a present hydrating patch composition. At least in some embodiments, the filler is includes at least one from the following list: hollow borosilicate glass beads, a combination of borosilicate glass beads and lime, perlite, siloxane-coated perlite, a combination of sand and siloxane-coated perlite, and a combination of hollow borosilicate glass beads and silica flour.

In some embodiments, a hydrating patch formulation is prepared with hollow borosilicate glass beads with a crush strength from 250 to 6,000 psi and silica flour in the ratio between the hollow borosilicate glass beads and the silica flour is from 1:1 to 3:1.

Further embodiments include a hydrating patch composition formulated with hollow borosilicate glass beads and lime used in the amount from 0.0625% to 10% of the dry weight of hollow borosilicate glass beads.

Other embodiments include a hydrating patch formulation in which the filler is at least one of the following: perlite, a combination of perlite with aluminum oxide, and a combination of perlite, aluminum oxide and fibers. Various fibers can be used in these formulations, including polypropylene stealth fibers, acrylic fibers and cellulosic fibers.

Additional embodiments include a hydrating patch formulations in which the filler is siloxane-coated perlite used in the amount from 2% to 50%, based on the dry weight of the hydrating patch composition.

Further hydrating patch formulations include those formulated with hydroxyethyl methyl cellulose, magnesium aluminum silicate, diutan gum and any combination thereof. Additional embodiments provide hydrating patch compositions comprising at least one abrasive agent in the amount from 0.05% to 60% and wherein the abrasive agent is selected from the group consisting of: aluminum oxide brown, aluminum oxide white, garnet dust, stardust, copper slag, silica flour and any combinations thereof.

Various binders can be used in a hydrating patch composition, including, but not limited to, a binder is selected from the group consisting of polyacrylates, polyacetates and polyvinyl-acetates.

Further embodiments provide a kit for making a hydrating patch formulation. This kit may comprise a powder mixture of calcium aluminate cement, DTPA-coated caclined synthetic gypsum, gypsum, class C cement, calcium carbonate. The kit may further include hollow borosilicate glass beads and lime, and wherein the hollow borosilicate glass beads and lime are stored separately from the power mixture.

Methods for patching various surfaces are provided as well. Further embodiments also provide methods for controlling viscosity of a hydrating patch formulation. In these methods, at least the following compounds are mixed together: Portland cement in the amount from 2% to 10%, Calcium Sulfate Hemihydrate in the amount from 2% to 30%, Gypsum in the amount from 0% to 15%, Calcium Aluminate Cement in the amount from 15% to 40%, Calcium Carbonate in the amount from 0% to 40%, hollow borosilicate glass beads in the amount from 1% to 30%; and at least one binder in the amount from 10% to 40%. The viscosity of the mixture is then controlled by adding to the mixture lime in the amount from 0.0625% to 10% based on the dry weight of the mixture.

DETAILED DESCRIPTION

The invention provides cementitious hydrating patch compositions useful for patching walls, flooring and ceiling. These patch compositions can be applied over various surfaces and are suitable to patching minor cracks as well as for repairing surfaces which are deeply damaged.

These patch compositions are especially useful for applying over concrete, but can be used over wood floor or surface as well. Unlike other patch formulations which set by evaporation, the inventive patch formulations set by hydration and consequently they do not shrink or shrink only minimally. As a result, the hydrating patch compositions adhere better to the surface, create a tight pluge and do not easily dislodge.

In some embodiments, a high-strength hydrating patch formulation comprises at least the following:
1. Portland Cement (2%-10%)
2. Calcium sulfate hemihydrate (2%-30%)
3. Gypsum (0-15%)
4. Calcium Aluminate Cement (15-40%)
5. Calcium Carbonate (0-40%)
6. At least one filler (1%-30%)
7. At least one binder and/or bond adhesion additive (10%-40%)

In further embodiments, a high-strength hydrating patch formulation may further comprise at least one of the following:
8. At least one rheological modifier (0.05%-10%)
9. At least one abrasive agent (0.05%-60%)
10. At least one set retarder (0.05%-1%)

Further embodiments include high-strength hydrating patch compositions which further comprise at least one abrasive agent in the amount from 0.05% to 60%. The amount of water for a high-strength hydrating patch composition ranges from 18 cc to 70 cc for every 100 parts of the composition. More preferred water demands range between 18 cc and 60 cc for every 100 parts of the composition, with the most preferred range being between 20 cc to 55 cc of water for every 100 parts of the composition.

Gypsum is a chemical reactant and/or contributing binder in the composition. Suitable gypsum sources include, but are not limited to, calcium sulfate anhydrous, natural anhydrite, natural gypsum ($CaSO_4 \cdot 2H_2O$), calcium sulfate hemi-hydrate beta, synthetic gypsum, calcium sulfate hemi-hydrate alpha, continuous kettle stucco (calcined gypsum) and FST NOGO CKS stucco (synthetic calcined gypsum spray-coated with diethylene-triamine-pentaacetic acid (DTPA)).

Other reactant/binders include, but are not limited to, the calcium alumina cement, portland cements, and ethylene vinyl acetate copolymers. Various other suitable binders include, but are not limited to, polyacrylates, polyacetates and polyvinyl-acetates.

Suitable fillers include, but are not limited to, hollow borosilicate glass beads, coated and uncoated perlite, siloxane-coated perlite, calcium carbonate, lime, silica flour and sand. Fillers tend to expand the composition and can increase yield, but also pose a potential problem that has to be addressed: most of the fillers do not contribute to strength and therefore, they contribute to a softer surface and decrease the bond of the patch to the substrate or surface to which the patch is applied.

Suitable rheological modifiers include, but are not limited to, hydrous magnesium aluminum silicate, polycarboxylate, lime, clay and stabilizers.

The hydrating patch formulations may further comprise at least one abrasive agent. The abrasive agents include, but are not limited to, aluminum oxide (brown and white), garnet dust, stardust, copper slag and silica flour and combinations thereof. Adding an abrasive agent to a patch formulation is helpful for creating a patch which can be easily sanded without blowing the patch off the substrate. Thus, a patch with a smooth surface can be obtained easily. However, an abrasive agent can create grit and therefore, such patch formulations may not be suitable for some applications by a trowel due to scratching of the surface to which this patch is to be applied.

One embodiment provides a CAC-based patching product which utilizes synthetic calcined gypsum coated with diethylene-triamine-pentaacetic acid (DTPA). Methods for obtaining synthetic calcined gypsum coated with DTPA and formulations were described in U.S. patent application Ser. No. 14/514,961. The use of DTPA-coated synthetic calcined gypsum aids in controlling rheology of a hydrating patch.

Table 1 below describes components of an embodiment for a high-strength hydrating patch composition.

TABLE 1

ADDITIVES AND FUNCTIONS IN HIGH STRENGTH HYDRATING PATCH

| Component | Function |
|---|---|
| Calcium Aluminate Cement - known as CAC, HAC or Fondu cement | CAC cement: reaction catalyzed by lithium carbonate, the CAC reacts with the Portland cement and gypsum. A balanced amount results a sold cast material with positive expansion which consumes large quantities of water during the reaction. |
| Calcium Sulfate Hemi-hydrate (FST NOGO CKS stucco) | Strength development, reacts with Portland and CAC, NOGO controls local hydration around calcium sulfate hemi-hydrate particles, reduces stiffening, longer lubricity around particles. |
| Ground Gypsum such as but not limited to Terra Alba ® Gypsum | Reacts with cement and CAC |
| Class C cement - but not limited to the same. Portland cements I, II, III, V, Class C | Hydration and strength development |
| Calcium carbonate | Used as filler and plays some role in a hydration reaction |
| Hydroxyethyl methyl cellulose (HEMC) | It imparts well-balanced properties, including open time, adhesion and shear strength. WALOCEL ™ MT 30000 PV also adds good workability and enhances water retention |
| Hydrous magnesium aluminum silicate | Provides gelling and rheological properties used to thicken and stabilize aqueous systems |
| Lithium carbonate, lithium sulfate and/or lithium hydroxide | Used as set accelerator in CAC system. |
| Citric acid | Set inhibitor, viscosity stabilizer |
| Polycarboxylate - such as but not limited to MELFUX 6681, 4930, 2651, 2641, 5581, ethacryl G, M, viscocrete materials | Works in conjunction with rheology modifiers/stabilizer, provides ease of mixing, impacts vicat set, and Gilmore initial an final set, strength rate gain |
| Defoamer (Vinapor 9010F) | Helps removing air from the mixture, creating smoother surface, improves strength |

TABLE 1-continued

ADDITIVES AND FUNCTIONS IN HIGH STRENGTH HYDRATING PATCH

| Component | Function |
|---|---|
| Stabilizer - Diutan gum, but not limited to the same. | Keeps the mixtures evenly distributed, provides for uniform reaction of reactants |
| Copolymer powder of vinyl acetate and ethylene (Vinnapas 4021T) | Copolymer powder of vinyl acetate and ethylene and is dispersible in water |
| Borosilicate glass beads (3M K-46 beads) | Glass Beads K46 have a density of 0.46 g/cc and an isostatic crush strength of 6000 psi |

Embodiments provide hydrating patch compositions for floor patching which are easy to mix, can be skim-coated or used for deeper patches, have moderate to high compressive strengths and can be sanded within hours after they are set. These hydrating patch formulations are creamy and smooth on the trowel or tools used for application and bond well to the substrate.

At least some of the present hydrating patch compositions consume all of the water during hydration and setting. This provides for a system in which items can be placed on patched floor sooner as the patch hardens faster.

The present hydrating patch formulations have bonds and compressive strength equal to or greater than that expected from materials used currently. At the same time, the present hydrating patch formulations demonstrate unexpectedly higher yields. Table 2 below provides hydrating patch compositions with synthetic calcined stucco coated with DTPA (NOGO FST CKS STUCCO).

TABLE 2

HIGH-STRENGTH HYDRATING CEMENTITIOUS PATCH FORMULATION UTILIZING NOGO FST CKS STUCCO

| Formula A: Components | Amount (lbs) | Amount (%) | Range/Preferred Range (lbs) |
|---|---|---|---|
| Calcium Aluminate Cement (CAC or HAC) | 752 | 28.46 | 700-800/725-775 |
| Calcium Sulfate Hemi-hydrate (FST NOGO CKS Stucco) | 260 | 9.84 | 100-450/225-325 |
| Gypsum | 85 | 3.22 | 0-400/50-100 |
| Class C cement | 130 | 4.92 | 75-200/100-150 |
| Calcium carbonate | 600 | 22.71 | 0-1000/400-800 |
| Hydroxyethyl methyl cellulose (HEMC) (Walocel) | 4 | 0.15 | 0-12/2-6 |
| Hydrous magnesium aluminum silicate (Mini-U Gel FG) | 8 | 0.30 | 0-12/6-10 |
| Lithium carbonate | 4 | 0.15 | 1-8/2-6 |
| Citric acid | 0 | 0 | 0-5/0-3 |
| Polycarboxylate Ether (Melflux 6681) | 4 | 0.15 | 0-12/2-8 |
| Defoamer (Vinapor 9010F) | 3 | 0.11 | 1-9/2-4 |
| Stabilizer premix (3 parts HYDROCAL C-Base Gypsum Cement and 1 part Duitan Gum by weight) | 2 | 0.08 | 0-8/1-4 |
| Ethylene Vinyl Acetate co-polymer (Vinnapas 4021T) | 330 | 12.49 | 0-800/100-700 |

TABLE 2-continued

HIGH-STRENGTH HYDRATING CEMENTITIOUS PATCH FORMULATION UTILIZING NOGO FST CKS STUCCO

| Formula A: Components | Amount (lbs) | Amount (%) | Range/Preferred Range (lbs) |
|---|---|---|---|
| Hollow Borosilicate Glass beads (K-46 beads) | 460 | 17.41 | 100-750 |
| TOTAL | 2642 | 99.99 | 4108 |

As can be appreciated from Table 2, some embodiments include the use of hollow borosilicate glass beads as a filler either in place of or together with sand and/or silica flour. The borosilicate glass beads lighten the weight of the resultant patching product and at the same time provide slip to the patch on the trowel when applied. The glass beads provide for a smoother, creamier less gritty, easy to trowel patch formulation.

It will be appreciated from Table 2B below that the present hydrating patch composition (Formula A as defined in Table 2) has a better compressive strength in comparison to a current patch technology. The following two control formulations are used for comparative analysis.

TABLE 2A

COMPARATIVE CONTROL FORMULATIONS

| Components | Control 1 Range (%) | Control 2 Range (%) |
|---|---|---|
| Calcium Aluminate Cement (CAC or HAC) | 30-60 | 10-30 |
| Portland Cement | 3-7 | 5-10 |
| Calcium Sulfate | 7-13 | 0 |
| Vinyl Acetate Copolymer | 10-30 | 0.5-10 |
| Calcium carbonate | 30-60 | 0 |
| Cellulose | 1-5 | 0 |
| Crystalline Silica | 0.1-1 | 0 |
| Quartz | 0 | 40-55 |
| Slag | 0 | 10-30 |

As can be appreciated from Table 2B, a hydrating patch composition defined by formula A in Table 2 has an improved compressive strength in comparison to a control formulation defined in Table 2A as control 1.

TABLE 2B

COMPRESSIVE STRENGTH (50 cc mix design)

| | 24 Hour Bench Cubes (PSI) | 7 Day Low Temperature Oven @ 110 deg F. (PSI) | 14 Day Low Temperature Oven @ 110 deg F. (PSI) | 28 Day Low Temperature Oven @ 110 deg F. (PSI) | 28 Day Moist Cure in Baggie (PSI) |
|---|---|---|---|---|---|
| Formula A | 1550 | 3450 | 3433 | 3008 | 1475 |
| Current Patch Technology (Control 1) | 958 | 2792 | 2650 | 2375 | 900 |

TABLE 2B-continued

COMPRESSIVE STRENGTH (50 cc mix design)

| | 24 Hour Bench Cubes (PSI) | 7 Day Low Temperature Oven @ 110 deg F. (PSI) | 14 Day Low Temperature Oven @ 110 deg F. (PSI) | 28 Day Low Temperature Oven @ 110 deg F. (PSI) | 28 Day Moist Cure in Baggie (PSI) |
|---|---|---|---|---|---|
| Compressive Strength % Higher | 61.79 | 23.57 | 29.55 | 26.65 | 63.89 |

The compressive strength of the present hydrating patch composition is on the average over 61% higher in the moist cure testing and 23-27% higher when the composition is oven or bench cured.

Table 2C demonstrates improvement in yield and lower weight for the present hydrating patch compositions. Formula A and current control patch were prepared as 50 cc mixtures in water. The mixtures were allowed to dry either at the room temperature, in an oven or in humidified environment. Dry densities of all samples were measured and recorded in Table 2C below.

TABLE 2C

DRY DENSITIES AND EXTENDED YIELD

| | Wet Density Original Out of Molds (lbs/FT3) | 24 Hour Bench Cubes (lbs/FT3) | 7-8 Day Low Temperature Oven @110 deg (lbs/FT3) | 14 Day Low Temperature Oven @110 deg F. (lbs/FT3) | 28 Day Low Temperature Oven @110 deg F. (lbs/FT3) | 28 Day Moist Cure in Baggie (lbs/FT3) |
|---|---|---|---|---|---|---|
| Formula A | 65.63 | 65.56 | 51.93 | 52.21 | 51.59 | 64.04 |
| Current Patch Technology (Control 1) | 87.94 | 83.00 | 69.29 | 70.54 | 68.55 | 82.66 |
| Yield Increase (%) | 33.99% | 26.66% | 33.42% | 35.10% | 32.87% | 29.07% |

As can be appreciated from Table 2C, the yield improvement is consistently over 25% under all conditions tested. The most accurate measure of the true extension is expected to be the original, out of molds extension. In this case, the yield improvement is almost 34% with high strength.

A hydrating patch composition of Formula A also provides an improved yield and evaporation after it has been applied to a surface. Comparative data on evaporation for Formula A are presented in Table 2D below.

TABLE 2D

EVAPORATION PER CUBIC FOOT OF EXTENDED YIELD (evaporation at each stage based on loss from original weight as measured in formulations with 50% water)

| | Wet Density Original Out of Molds (#/ft3) | 24 Hour Bench Cubes (#/FT3) | 7-8 Day Low Temperature Oven @110 deg F. (#/FT3) | 14 Day Low Temperature Oven @110 deg F. (#/FT3) | 28 Day Low Temperature Oven @110 deg F. (#/FT3) | 28 Day Moist Cure in Baggie (#/FT3) |
|---|---|---|---|---|---|---|
| Formula A | 65.63 | 65.56 | 51.93 | 52.21 | 51.59 | 64.04 |
| Formula A Evaporation (#) | n/a | 0.07 | 13.7 | 13.42 | 14.04 | 1.59 |
| Current Patch Technology (Control 1) | 87.94 | 83.00 | 69.29 | 70.54 | 68.55 | 82.66 |

TABLE 2D-continued

EVAPORATION PER CUBIC FOOT OF EXTENDED YIELD (evaporation at each stage based on loss from original weight as measured in formulations with 50% water)

| | Wet Density Original Out of Molds (#/ft3) | 24 Hour Bench Cubes (#/FT3) | 7-8 Day Low Temperature Oven @110 deg F. (#/FT3) | 14 Day Low Temperature Oven @110 deg F. (#/FT3) | 28 Day Low Temperature Oven @110 deg F. (#/FT3) | 28 Day Moist Cure in Baggie (#/FT3) |
|---|---|---|---|---|---|---|
| Current Patch Technology (Control 1) Evaporation (#/ft3) | n/a | 4.49 | 18.65 | 17.4 | 19.39 | 5.28 |
| Evaporation Higher (#/ft3) | n/a | 4.42 | 4.95 | 3.98 | 5.35 | 3.69 |

Further embodiments provide hydrating patch compositions with hollow borosilicate glass beads of various compressive strength and density. Suitable hollow borosilicate glass beads include hollow borosilicate glass beads with crush strength of at least 100 psi, at least 250 psi, at least 300 psi, at least 400 psi, at least 500 psi, at least 600 psi, at least 700 psi, at least 800 psi, at least 900 psi and at least 1,000 psi. In some embodiments, suitable hollow borosilicate glass beads have a crush strength in the range from 250 psi to 3,000 psi. In further embodiments, suitable hollow borosilicate glass beads have a crush strength in the range from 250 psi to 6,000 psi. Some suitable hollow borosilicate glass beads are listed in Table 3.

TABLE 3

HOLLOW BOROSILICATE GLASS BEAD DENSITY AND CRUSH STRENGTHS

| Hollow Borosilicate Glass Beads | True Density (g/cc) | Crush Strength (90% survival, psi) | Percent Crush Strength of K-46 |
|---|---|---|---|
| K-46 | 0.46 | 6,000 | n/a |
| K37 | 0.37 | 3,000 | 50% |
| K15 | 0.15 | 300 | 5% |
| K1 | 0.10 | 250 | 4.2% |

Some embodiments include hydrating patch formulations listed in Table 3A.

TABLE 3A

HIGH-STRENGTH CEMENTITIOUS PATCH FORMULATIONS WITH HOLLOW BOROSILICATE GLASS BEADS

| | Borosilicate Glass Bead Type | | |
|---|---|---|---|
| | K-37 Formula B | K-15 Formula C | K-1 Formula D |
| Component | Amount (#) | Amount (#) | Amount (#) |
| Calcium Aluminate Cement (CAC or HAC or Fondu) | 752 | 752 | 752 |
| Calcium Sulfate Hemi-Hydrate (FST NOGO CKS Stucco) | 260 | 260 | 260 |
| Gypsum (Terra Alba) | 85 | 85 | 85 |
| Portland Cement (Class "C") | 130 | 130 | 130 |
| Calcium carbonate | 600 | 600 | 600 |
| Hydroxyethyl methyl cellulose (HEMC) (Walocel) | 4 | 4 | 4 |
| Hydrous magnesium aluminum silicate (Mini-U Gel FG) | 8 | 8 | 8 |
| Lithium carbonate (Ultra Fine) | 4 | 4 | 4 |
| Citric acid | 0 | 0 | 0 |
| Polycarboxylate Ether (Melflux 6681) | 4 | 4 | 4 |
| Defoamer (Vinapor 9010F) | 3 | 3 | 3 |
| Stabilizer premix (Diutan Gum) | 2 | 2 | 2 |
| Ethylene Vinyl Acetate co-polymer (Vinnapas 4021T) | 330 | 330 | 330 |
| Subtotal all additives except Glass Beads | 2182 | 2182 | 2182 |
| Hollow Borosilicate Glass Beads | 400 | 165 | 152 |
| TOTAL | 2582 | 2347 | 2334 |

The bead changes in formulations of Table 3A were made by volume replacement rather than by weight. Hollow borosilicate glass beads can be used in various amounts. In some embodiments, the hollow borosilicate glass beads are used in the amount from about 5% to about 50%. In other embodiments, the hollow borosilicate glass beads are used in the amount from about 5% to about 40%. In some embodiments, the hollow borosilicate glass beads are used in the amount from about 5% to about 30%. In some embodiments, the hollow borosilicate glass beads are used in the amount from about 5% to about 20%. In some embodiments, the hollow borosilicate glass beads are used in the amount from about 5% to about 10%.

As can be appreciated from Table 3B below, formulations with hollow borosilicate glass beads listed in Table 3A can be formulated into a hydrating patch composition with high compressive strength.

TABLE 3B

COMPRESSIVE STRENGTH OF FORMULATIONS WITH HOLLOW BOROSILICATE GLASS BEADS

|  | 24 Hour Bench Cubes (PSI) | 28 Day Low Temperature Oven @ 110 deg F. (PSI) | 28 Day Moist Cure in Baggie (PSI) |
|---|---|---|---|
| Formula A | 1550 | 3008 | 1475 |
| Current Patch Technology (Control 1) | 958 | 2375 | 900 |
| Formula B | 1233 | 2917 | 1392 |
| Formula C | 1242 | 2575 | 1167 |
| Formula D | 1233 | 2317 | 1050 |

Hollow borosilicate glass beads may rapidly increase the viscosity of a hydrating patch formulation, which is not desirable because it leads to thickening of the formulation prior to its application, and some of the thickened formulation may no longer be suitable for application or the drying time for this formulation may lengthen.

Other embodiments include hydrating patch formulations to which lime and/or similar type of material has been added. Suitable lime includes IVORY LIME™ (autoclaved finish lime, $CaMg(OH)_4$ available from the United States Gypsum Company, Chicago, Ill.). In further embodiments, lime can be used in combination with or instead of sodium hydroxide, magnesium hydroxide and/or ammonium hydroxide as alternatives to lime.

Surprisingly, adding lime such as, but not limited to IVORY LIME™ stabilizes the viscosity of the hydrating patch formulation and prevents it from thickening. Lime can be used in different amounts for the purpose of stabilizing a hydrating patch formulation with hollow borosilicate glass beads. At least in some embodiments, lime is used in the amount from 0.25% to 5% of the dry weight of borosilicate glass beads. In other embodiments, lime can be used in the amount from 0.0625% to 10% of the dry weight of borosilicate glass beads. The most preferred amount for lime is 0.125% to 5% of the dry weight of borosilicate glass beads.

Further embodiments provide a method where a present hydrating patch formulation is premixed and can be stored on a shelf for a period of time prior to its use. At least in some of these embodiments, a premix for high-strength hydrating patch formulation can be prepared as shown in Table 4 below.

TABLE 4

HIGH-STRENGTH CEMENTITIOUS PATCH COMPOSITION

| Formula E: Components | Amount (#) | Amount (%) |
|---|---|---|
| Calcium Aluminate Cement (CAC or HAC) | 1320 | 32.19 |
| Calcium Sulfate Hemi-hydrate (FST NOGO CKS Stucco) | 460 | 11.22 |
| Gypsum | 150 | 3.66 |
| Class C cement | 230 | 5.61 |
| Calcium carbonate | 1050 | 25.60 |
| Hydroxyethyl methyl cellulose (HEMC) | 7 | 0.17 |
| Hydrous magnesium aluminum silicate | 14 | 0.34 |
| Lithium carbonate | 7 | 0.17 |
| Citric acid | 1 | 0.02 |
| Polycarboxylate Ether (Melflux 6681) | 3.5 | 0.09 |
| Vinapor 9010F (defoamer) | 5 | 0.12 |
| Stabilizer premix (3 parts HYDROCAL C-Base Gypsum Cement and 1 part Duitan Gum by weight) | 3.5 | 0.09 |
| Ethylene Vinyl Acetate co-polymer (Vinnapas 4021T) | 750 | 18.29 |
| Aluminum Oxide (white) | 100 | 2.44 |
| Glass beads (K-37 beads) | 0 | 0 |
| TOTAL | 4101.50 | 100.01 |

The premix can be then further mixed with hollow borosilicate glass beads and lime prior to use. As shown in Table 4A below, further embodiments include a hydrating patch formulation of Table 4 to which borosilicate glass beads and lime are added. As further reported in Table 4A, adding lime stabilizes the viscosity of a hydrating patch formulation with hollow borosilicate glass beads.

TABLE 4A

THE USE OF HIGH STRENGTH HYDRATING PATCH PREMIX WITH HOLLOW BOROSILICATE GLASS BEADS

| Batch = 900 lbs of Premix FORMULA E | Hollow Glass Beads per Batch (lbs) | Lime Added per Batch (lbs) | Gilmore Set Time Initial/Final (min) | Brabender Viscosity in Brabender Units (BU) Note: the lower the number the less viscous the mix | Comment |
|---|---|---|---|---|---|
| Batch Control | 100 | 0 | 33/76 | 160 | Thin Creamy |
| Batch 1 | 100 | 0 | 33/69 | 830 | Thick Pasty |
| Batch 2 | 100 | 0.25 | 29/55 | 740 | Thick Pasty |
| Batch 3 | 100 | 1.25 | 25/55 | 500 | Creamy |
| Batch 4 | 100 | 1.75 | 25/52 | 350 | Thin Creamy |
| Batch 5 | 100 | 2.5 | 24/51 | 240 | Thin Creamy |

In TABLE 4A, the Brabender test is run to determine the viscosity of a hydrating patch formulation. The lower the number, the lower is the viscosity. A small cylindrical container is filled to the top with the mix and then put in place on the Brabender apparatus. A spindle on a head is lowered into the slurry and then the machine is turned on. The spindle rotates and a measurement of the resistance of the spindle turning is made in what is referred to as brabender units. As shown in Table 4A, the more lime is added to the hydrating patch formulation, the lower the viscosity of the formulation is.

Unexpectedly, lime not only improves the rheology control of a hydrating patch composition, set control and drying rate, but surprising lime also improves the surface hardness and the flexural strength of the hydrating patch formula. TABLE 4B reports the unforeseen impact of lime on a hydrating patch composition with respect to surface hardness and flexural strength improvement.

TABLE 4B

THE USE OF HIGH STRENGTH PATCH PREMIX WITH BEADS

| Batch = 900 lbs of Premix | Hollow Glass Beads per Batch (lbs) | Ivory Lime Added per Batch (lbs) | Dry Density (lbs/ft3) (note: top to bottom only 10% variation in density) | Monotron Surface Hardness: (Kg load for 0.1" penetration of 10 mm ball) | Increase in Hardness vs. Formula E/Batch 1 with NO LIME (%) | Flexural Strength MOR (PSI) | MOR Increase vs. Formula E/Batch 1 with NO LIME (%) |
|---|---|---|---|---|---|---|---|
| Batch Control | 100 | 0 | 59.8 | 19.25 | n/a | 746 | n/a |
| Batch 1 | 100 | 0 | 61.6 | 20.75 | n/a | 781 | n/a |
| Batch 2 | 100 | 0.25 | 65.7 | 26.50 | 27.70 | 1079 | 38.16 |
| Batch 3 | 100 | 1.25 | 65.8 | 32.50 | 56.63 | 1249 | 59.92 |
| Batch 4 | 100 | 1.75 | 66.6 | 35.50 | 71.08 | 1443 | 84.76 |
| Batch 5 | 100 | 2.5 | 65.8 | 37 | 78.00 | 1569 | 100.25 |

As can be seen from Table 4B, the surface hardness and the flexural strength are improved when lime is added to a hydrating patch formulation. These improvements are observed when lime is used in the range from 0.0625% to 10% of the dry weight of borosilicate glass beads. The percentage of improvement over the range is as high as 78% improvement in surface hardness and over 100% improvement in Flexural Strength (MOR). Based on the data obtained, it is believed that the preferred range for lime is 0.125% to 5% of the dry weight of hollow borosilicate glass beads.

This improvement in surface hardness and flexural strength provides a significant advantage to the present hydrating patch formulation if used for repairing a floor which is constantly exposed to abrasion and loads.

Further embodiments provide hydrating patch formulations with rheological modifiers omitted.

TABLE 5

HIGH-STRENGTH HYDRATING CEMENTITIOUS PATCH PREMIX WITH 3 RHEOLOGY MODIFIERS OMITTED

| Formula F: Components | Amount (LBS) | Amount (%) |
|---|---|---|
| Calcium Aluminate Cement (CAC or HAC) | 1320 | 28.46 |
| Calcium Sulfate Hemi-hydrate (FST NOGO CKS Stucco) | 460 | 9.84 |
| Gypsum | 150 | 3.22 |
| Class C cement | 230 | 4.92 |
| Calcium carbonate | 1050 | 22.71 |
| Walocel (hydroxyethyl methyl cellulose (HEMC) | 0 | 0 |
| Mini-U Gel FG (hydrous magnesium aluminum silicate) | 0 | 0 |
| Lithium carbonate | 7 | 0.15 |
| Citric acid | 1 | 0 |
| Polycarboxylate Ether (Melflux 6681) | 3.5 | 0.15 |
| Vinapor 9010F (defoamer) | 5 | 0.11 |
| Stabilizer premix | 0 | 0.00 |
| Ethylene Vinyl Acetate co-polymer (Vinnapas 4021T) | 450 | 12.49 |
| Glass beads (K-37 beads) | 0 | 0 |
| TOTAL | 3976.5 | 99.99 |

Further embodiments include hydrating patch formulations comprising Calcium Aluminate Cement, FST NOGO CKS Stucco, Gypsum, Class C cement, calcium carbonate, lithium carbonate, citric acid, polycarboxylate, at least one defoamer, ethylene-vinyl acetate co-polymer and hollow borosilicate glass beads. These compositions can be formulated with or without at least one rheological modifier. Surprisingly, omitting rheological modifiers results in a patch with stronger surface and stronger bond of the patch to the surface. Table 5A below reports bond strength results for formulations prepared with or without hydroxyethyl methyl cellulose, magnesium aluminum silicate or a stabilized premix.

TABLE 5A

SURFACE CHEMISTRY DIFFERENCES FOR HIGH STRENGTH PATCH
FORMULATIONS WITH HOLLOW BOROSILICATE GLASS BEADS DEPENDENT ON
THE USE OF A RHEOLOGICAL MODIFIER

| Batch = 900 # of Premix FORMULA F | Hollow Glass K37 Beads per Batch (#) | Walocel (#/Batch) | Minugel (#/Batch) | Stabilizer Premix (#/Batch) | Bond Strength Bond Pull on Plywood (PSI) 48 hours | Brabender Viscosity in Brabender Units (BU) Note: the lower the number the less viscous the mix | BYK Gardner Abrasion after 100 cycles with ACE 80 medium grit paper after 24 hrs (grams loss to surface) |
|---|---|---|---|---|---|---|---|
| Batch Control | 100 | 1.5 | 3 | 0.75 | 70 | 900 | 1.82 |
| Batch 1 | 100 | 1.5 | 3 | 0 | 37.50 | 1000+ | 0.55 |
| Batch 2 | 100 | 1.5 | 0 | 0.75 | 60.50 | 900 | 0.55 |
| Batch 3 | 100 | 0 | 3 | 0.75 | 73 | 720 | 0.94 |
| Batch 4 | 100 | 0 | 0 | 0 | 140 | 90 | 0.18 |

It can be appreciated from Table 5A and other data provided in this disclosure that removing all three rheological modifiers may nearly double the bond strength of a hydrating patch formulation. The abrasion results also indicate that the hydrating patch has developed a tougher surface without the three modifiers. Accordingly, further embodiments provide hydrating patch formulations in which the use of a rheological modifier is adjusted such that either no rheological modifier is used or only one rheological modifier is used.

Further embodiments provide a method in which bond strength and abrasiveness of a hydrating patch are controlled by omitting at least one rheological modifier and/or by altering the amount of the modifier used. At least in some embodiments, only hydroxyethyl methyl cellulose (HEMC) is used in a hydrating patch formulation which is prepared without magnesium aluminum silicate or a stabilizer premix (3 parts HYDROCAL C-Base Gypsum Cement and 1 part Duitan Gum by weight).

Further embodiments provide hydrating patch formulations with a long shelf life and methods of making same. These hydrating patch formulations are prepared as a mixture comprising of Calcium Aluminate Cement, FST NOGO CKS Stucco or some other stucco, gypsum, class C cement, calcium carbonate, lithium carbonate, citric acid, defoamer and a polymeric binder. Hollow borosilicate glass beads, water and rheological modifiers are then added right before the hydrating patch formulation is to be used. Storing a hydrating patch formulation separately from the light-weight filler prevents loss of materials through the system and stratification of the formulation while on the self.

According to further embodiments, a hydrating patch formulation can be formulated such that to obtain a patch with a softer surface. While there may be applications where this is desirable, in other applications the surface hardness is a key to providing a solid patch with which to bond adhesives and/or materials which may be poured upon it. In some cases, the patch may be a serviceable area and has to have high hardness to resist wear. While it is generally accepted that adding a light-weight filler may decrease hardness of a resulting patch, this invention provides embodiments in which a light weight filler such as hollow borosilicate glass beads are used, yet the resulting hydrating patch can be sanded and it has a sufficiently hard surface. Further embodiments provide hydrating patch formulations with different polymeric binders. Some of these formulations are listed in Table 7 below.

TABLE 7

HIGH-STRENGTH CEMENTITIOUS PATCH FORMULATION WITH
ALTERNATE POLYMERS

| | Polymer Type But Not Limited to the Same | | |
|---|---|---|---|
| Component | Vinnapas 5111L Formula H Amount (#) | Vinnapas 5025L Formula I Amount (#) | Vinnapas 5012 Formula J Amount (#) |
| Calcium Aluminate Cement (CAC or HAC or Fondu) | 600 | 600 | 600 |
| Calcium Sulfate Hemi-hydrate (FST NOGO CKS Stucco) | 230 | 230 | 230 |
| Gypsum (Terra Alba) | 85 | 85 | 85 |
| Portland Cement (Class "C") | 175 | 175 | 175 |
| Calcium carbonate | 680 | 680 | 680 |
| Walocel MK 30000PF (hydroxyethyl methyl cellulose (HEMC) | 4 | 4 | 4 |
| hydrous magnesium aluminum silicate (Mini-U Gel FG) | 8 | 8 | 8 |
| Lithium carbonate (Ultra Fine) | 4 | 4 | 4 |
| Citric acid | 0 | 0 | 0 |
| Polycarboxylate Ether (Melflux 6681) | 2 | 2 | 2 |
| Defoamer (Vinapor 9010F) | 3 | 3 | 3 |
| Stabilizer premix (Diutan Gum) | 2 | 2 | 2 |
| Ethylene Vinyl Acetate co-polymer Polymer Type But Not Limited to the Same | 330 | 330 | 330 |
| Glass Beads | 400 | 400 | 400 |
| TOTAL | 2523 | 2523 | 2523 |

As shown in Table 7A below, compressive strength of hydrating patch formulations prepared with different polymers is significantly improved over a control patch formulation.

TABLE 7A

COMPRESSIVE STRENGTH OF HYDRATING PATCH
FORMULATIONS PREPARED WITH DIFFERENT POLYMERS

|  | 24 Hour Bench Cubes (PSI) | 28 Day Low Temperature Oven @110 deg F. (PSI) | 28 Day Moist Cure in Baggie (PSI) |
|---|---|---|---|
| Formula B | 1233 | 2917 | 1392 |
| Current Patch Technology (Control 1) | 958 | 2375 | 900 |
| Formula H | 1642 | 4100 | 1575 |
| Formula I | 1608 | 4083 | 1550 |
| Formula J | 1408 | 3575 | 1450 |

The present hydrating patch formulations also demonstrate greater abrasion resistance and reduced viscosity. As can be appreciated from Table 7B below, the present hydrating patch formulations are resistant to abrasion.

TABLE 7B

HIGH STRENGTH PATCH FORMULATIONS
DEMONSTRATE GREATER ABRASION
RESISTENCE AND REDUCED VISCOSITY

| Note: all mixes at 2 parts patch: 1 part water by weight | Gilmore Sets (Initial/Final) (min) | Brabender Viscosity in Brabender Units (BU) Note: the lower the number the less viscous the mix | BYK Gardner Abrasion after 100 cycles with ACE 80 medium grit paper after 24 hrs (grams loss from surface) |
|---|---|---|---|
| Current Patch Technology (Control 1) | 36/66 | 780 | 1.43-1.78 |
| Formula H | 20/66 | 180 | 1.0 |

Further embodiments provide hydrating patch formulations to which abrasive agents have been added. Suitable abrasive agents include, but are not limited to, aluminum oxide (brown and white), garnet dust, stardust, copper slag and silica flour and combinations thereof. As can be appreciated from Table 8 below, a hydrating patch formulation can be prepared with various abrasive agents.

TABLE 8

HIGH-STRENGTH CEMENTITIOUS PATCH FORMULATION WITH
ALTERNATIVE ABRASIVE AGENTS

| Component | Garnet Formula K Amount (#) | Stardust Formula L Amount (#) | Aluminum Oxide (White) Formula M Amount (#) |
|---|---|---|---|
| Calcium Aluminate Cement (CAC or HAC or Fondu) | 752 | 752 | 752 |
| Calcium Sulfate Hemi-hydrate (FST NOGO CKS Stucco) | 260 | 260 | 260 |
| Gypsum (Terra Alba) | 85 | 85 | 85 |
| Portland Cement (Class "C") | 130 | 130 | 130 |
| Calcium carbonate | 600 | 600 | 600 |
| Walocel MK 30000PF (hydroxyethyl methyl cellulose (HEMC) | 4 | 4 | 4 |
| hydrous magnesium aluminum silicate (Mini-U Gel FG) | 8 | 8 | 8 |
| Lithium carbonate (Ultra Fine) | 4 | 4 | 4 |
| Citric acid | 0 | 0 | 0 |
| Polycarboxylate Ether (Melflux 6681) | 2 | 2 | 2 |
| Defoamer (Vinapor 9010F) | 3 | 3 | 3 |
| Stabilizer premix (Diutan Gum) | 2 | 2 | 2 |
| Ethylene Vinyl Acetate co-polymer Vinnapas 4021T | 430 | 430 | 430 |
| Hollow Borosilicate Glass Beads (K37) | 200 | 200 | 200 |
| Abrasion Resistant Material | 200 | 200 | 200 |
| TOTAL | 2678 | 2678 | 2678 |

TABLE 8A

HYDRATING PATCH UTILIZING ALTERNATE ABRASIVE
AGENTS IS RESISTANT TO ABRASION

| Note: all mixes at 2 parts patch: 1 part water by weight | BYK Gardner Abrasion after 100 cycles with ACE 80 medium grit paper after 24 hrs (grams loss from surface) |
|---|---|
| Current Patch Technology (Control 1) | 1.43-1.78 |
| Formula H | 1.0 |
| Formula K | 0.84 |
| Formula L | 0.84 |
| Formula M | 0.64 |

While some embodiments provide hydrating patch formulations with hollow borosilicate glass beads, other embodiments contemplate the use of other fillers. In some embodiments, perlite is used as a filler. Either coated or uncoated perlite is suitable. Perlite can be used in various amounts. At least in some embodiments, perlite can be used in the amount from 2% to 50%, based on the dry weight of the formulation.

Still further embodiments provide hydrating patch formulations in which a filler comprises a combination of perlite and aluminum oxide. In these embodiments, perlite and aluminum oxide can be used in the 50:50 ratio.

Still further embodiments provide hydrating patch formulations in which a filler comprises a combination of perlite, aluminum oxide and fibers. Various fibers are suitable for this application and include polypropylene stealth fibers, acrylic fibers and cellulosic fibers. At least in some embodiments, the combination filler comprises perlite, aluminum oxide and ⅛" polypropylene stealth fibers. The amount of fibers may vary. At least in some embodiments, the useful range for fibers is from 0.1 to 2% by weight of total batch. At least in some embodiments, the preferred range for fibers is from 0.25-1%.

Embodiments for hydrating patch formulations comprising perlite, a combination of perlite with aluminum oxide and a combination of perlite with aluminum oxide and polypropylene stealth fibers include those listed in Table 9 below.

TABLE 9

HIGH-STRENGTH CEMENTITIOUS PATCH FORMULATION WITH ALTERNATE ABRASION RESISTANT ADDITIVES

| Component | Perlite Formula N Amount (lbs) | Perlite Aluminum Oxide Formula O Amount (lbs) | Perlite Aluminum Oxide Fiber Formula P Amount (lbs) |
|---|---|---|---|
| Calcium Aluminate Cement (CAC or HAC or Fondu) | 1320 | 752 | 752 |
| Calcium Sulfate Hemi-hydrate (FST NOGO CKS Stucco) | 460 | 260 | 260 |
| Gypsum (Terra Alba) | 150 | 85 | 85 |
| Portland Cement (Class "C") | 300 | 130 | 130 |
| Calcium carbonate | 1050 | 600 | 600 |
| Walocel MK 30000PF (hydroxyethyl methyl cellulose (HEMC) | 7 | 4 | 4 |
| hydrous magnesium aluminum silicate (Mini-U Gel FG) | 14 | 8 | 8 |
| Lithium carbonate (Ultra Fine) | 7 | 4 | 4 |
| Citric acid | 0 | 0 | 0 |
| Polycarboxylate Ether (Melflux 6681) | 3.5 | 2 | 2 |
| Defoamer (Vinapor 9010F) | 5 | 3 | 3 |
| Stabilizer premix (Diutan Gum) | 3.5 | 2 | 2 |
| Ethylene Vinyl Acetate co-polymer Vinnapas 4021T | 750 | 430 | 430 |
| Perlite (35/34 Siloxane treated perlite) | 200 | 200 | 200 |
| Aluminum Oxide (White) | 0 | 200 | 200 |
| Fibers (⅛" polypropylene stealth fibers) but not limited to the same, fibers such as cellulose and acrylic are suitable as well) | 0 | 0 | 20 |
| TOTAL | 4270 | 4470 | 4490 |

As can be appreciated from Table 9A below, a hydrating patch formulation with perlite as a filler has an improved bond strength in comparison to a control formulation. This result is unexpected because it is generally believed that adding a filler decreases the strength of a resulting patch formulation. As can be also appreciated from Table 9A, combining perlite with aluminum oxide improves further the bonding strength and abrasion resistance. Further improvements in abrasion resistance are achieved if a filler is a combination of perlite with aluminum oxide and polypropylene stealth fibers.

TABLE 9A

COMPARATIVE ABRASION AND BOND PULL STRENGTH OF HYDRATING PATCH WITH PERLITE

| Note: all mixes at 2 parts patch: 1 part water by weight | BYK Gardner Abrasion after 100 cycles with ACE 80 medium grit paper after 24 hrs (grams loss from surface) | Bond Pull on Plywood (PSI) 24 hours Average | Bond Pull on Plywood (PSI) 48 hours Average | Bond Pull on Plywood (PSI) 72 hours Average |
|---|---|---|---|---|
| Current Patch Technology (Control 1) | 1.43-1.78 | 140 | 125 | 133 |
| Formula N | 2.00 | 153 | 179.5 | 171.5 |
| Formula O | 1.00 | 142 | 142.5 | 177.5 |
| Formula P | 0.93 | | | |

Further embodiments provide hydrating patch formulations with coated perlite. At least in some embodiments, a hydrating patch is formulated with perlite which is pretreated with siloxane. The amount of the siloxane-coated perlite to be used in a formulation may vary and depends on the application. In general from 5% to 20% of siloxane-coated perlite can be used. Formulations with higher amounts of siloxane-coated perlite are suitable for patching walls and ceilings, while formulations with lower amounts of siloxane-coated perlite are particularly suitable for patching floor and other surfaces with heavy traffic. Some of such hydrating patch formulations are listed in Table 10 below. These hydrating patch formulations show excellent shrinkage compensation control.

TABLE 10

HIGH-STRENGTH CEMENTITIOUS PATCH FORMULATION WITH PERLITE

| | 35/34 Siloxane Perlite Type But Not Limited to the Same | | |
|---|---|---|---|
| Component | Perlite Formula Q Amount (#) | Perlite Formula R Amount (#) | Perlite Formula S Amount (#) |
| Calcium Aluminate Cement (CAC or HAC or Fondu) | 1222 | 1222 | 1222 |
| Calcium Sulfate Hemi-hydrate (FST NOGO CKS Stucco) | 400 | 400 | 400 |
| Gypsum (Terra Alba) | 200 | 200 | 200 |
| Portland Cement (Class "C") | 200 | 200 | 200 |
| Calcium carbonate | 950 | 950 | 950 |
| Walocel MK 30000PF (hydroxyethyl methyl cellulose (HEMC) | 6 | 6 | 6 |
| hydrous magnesium aluminum silicate (Mini-U Gel FG) | 12 | 12 | 12 |
| Lithium carbonate (Ultra Fine) | 5 | 5 | 5 |
| Citric acid | 1.5 | 1.5 | 1.5 |
| Polycarboxylate Ether (Melflux 6681) | 0 | 0 | 0 |
| Defoamer (Vinapor 9010F) | 5 | 5 | 5 |
| Stabilizer (Starvis 3003f) but not limited to the same | 4.25 | 4.25 | 4.25 |
| Ethylene Vinyl Acetate co-polymer Vinnapas 4021T | 550 | 550 | 550 |
| Shrinkage reducing agent Prevent C: (mineral oxide/glycol blend) | 50 | 50 | 50 |
| Perlite (35/34 Siloxane treated perlite) | 640 | 400 | 200 |
| TOTAL | 4445.75 | 4205.75 | 4005.75 |

As can be appreciated from Table 10A below, a hydrating patch formulated with siloxane-coated perlite has an improved compressive strength in comparison to a current patch technology used as a control.

TABLE 10A

COMPRESSIVE STRENGTH OF HYDRATING PATCH FORMULATED WITH SILOXANE-COATED PERLITE

| Note: all mixes at 2 parts patch: 1 part water by weight | 1 Hour Bench Cubes (PSI) | 3 Hour Bench Cubes (PSI) | 7-8 Day Low Temperature Oven @110 deg F. (PSI) | 28 Day Moist Cure in Baggie (PSI) |
|---|---|---|---|---|
| Current Patch Technology (Control 1) | 538 | 775 | 2792 | 900 |
| Formula Q | 367 | 533 | 1742 | 825 |
| Formula R | 475 | 583 | 2075 | 875 |
| Formula S | 742 | 808 | 3117 | 1250 |

Additional advantages of hydrating patch formulations prepared with siloxane-coated perlite include the ease with which this formulation can be mixed. These formulations can also provide a high positive expansion and a significantly decreased viscosity. As can be appreciated from Table 10B below, hydrating patch formulations with siloxane-coated perlite have a much lower viscosity in comparison to a control patch. These formulations also expand more, which allows to save on materials and produce a larger amount of a patch formulation.

TABLE 10B

PERLITE FORMULATIONS DEMONSTRATE EASE OF MIXING AND HIGHER POSITIVE EXPANSION

| Note: all mixes at 2 parts patch: 1 part water by weight | Brabender Viscosity in Brabender Units (BU) Note: the lower the number the less viscous the mix | Linear Expansion or Shrinkage (+/−) Percent |
| --- | --- | --- |
| Current Patch Technology (Control 1) | 780 | +0.018 |
| Formula R | 260 | +0.336 |
| Formula S | 240 | +0.336 |

Additional advantages provided by a hydrating patch formulation with siloxane-coated perlite include an increase in yield. As can be appreciated from Table 100 below, such formulations increase the yield by at least 10% or higher, depending on the amount of siloxane-coated perlite used in the formulations.

TABLE 10C

PERLITE FORMULATIONS DEMONSTRATE AN INCREASED YIELD

| Note: all mixes at 2 parts patch: 1 part water by weight | Wet Density Original Out of Molds (lbs/ft3) |
| --- | --- |
| Formula R | 67.24 |
| Current Patch Technology | 87.94 |
| Yield Increase (%) | 30.78 |
| Formula S | 79.73 |
| Current Patch Technology | 87.94 |
| Yield Increase (%) | 10.29 |

As can be appreciated by comparing table 10B with table 10C, the yield increase is also accompanied by the medium to high strength. This result is unexpected because the increase in yield usually leads to lower density and decreased strength.

Additional embodiments include hydrating patch formulations which use as filler a combination of hollow borosilicate glass beads and silica flour. These formulations can be prepared with hollow borosilicate glass beads of various compressive strength, including those with compressive strength from 250 psi to 6,000 psi. Silica flour with particles of different size can be used, including silica flour which can be passed through −200 mesh or −325 mesh. In some of these formulations, hollow borosilicate glass beads can be used in the amount from 5% to 50%, based on the dry weight of the formulation. The silica flour can be used in the amounts from 5% to 25%, based on the dry weight of the hydrating patch formulation.

At least in some formulations, the ratio between hollow borosilicate glass beads and silica flour is 1:1. In other formulations, the ratio between glass beads and silica flour is 2:1. In further formulations, the ratio is 3:1. Some of the hydrating patch formulations with a combination of hollow borosilicate glass beads and silica flour are listed in Table 11 below.

TABLE 11

HYDRATING PATCH FORMULATIONS WITH HOLLOW BOROSILICATE GLASS BEADS AND SILICA FLOUR IN COMBINATION

| Component | Silica Fume −325 mesh Formula T Amount (lbs) | Silica Fume −325 mesh Formula U Amount (lbs) | Silica Fume −200 mesh Formula V Amount (lbs) |
| --- | --- | --- | --- |
| Calcium Aluminate Cement (CAC or HAC or Fondu) | 752 | 752 | 752 |
| Calcium Sulfate Hemi-hydrate (FST NOGO CKS Stucco) | 260 | 260 | 260 |
| Gypsum (Terra Alba) | 85 | 85 | 85 |
| Portland Cement (Class "C") | 130 | 130 | 130 |
| Calcium carbonate | 600 | 600 | 600 |
| Walocel (hydroxyethyl methyl cellulose (HEMC) | 4 | 4 | 4 |
| hydrous magnesium aluminum silicate (Mini-U Gel FG) | 8 | 8 | 8 |
| Lithium carbonate (Ultra Fine) | 4 | 4 | 4 |
| Citric acid | 0 | 0 | 0 |
| Polycarboxylate Ether (Melflux 6681) | 4 | 4 | 4 |
| Defoamer (Vinapor 9010F) | 3 | 3 | 3 |
| Stabilizer premix (Diutan Gum) | 2 | 2 | 2 |
| Ethylene Vinyl Acetate co-polymer (Vinnapas 4021T) | 330 | 330 | 330 |
| Subtotal all additives except Beads | 2182 | 2182 | 2182 |
| Glass Beads | 400 | 400 | 400 |
| Mesh Silica Flour | 200 | 100 | 200 |
| TOTAL | 2782 | 2682 | 2782 |

A filler prepared from a combination of hollow borosilicate glass beads and silicate flour increases compressive strength of a hydrating patch composition. This can be further appreciated from Tables 11A and 11B below, in which different combinations of hollow borosilicate glass beads with silicate flour are compared to a control formulation.

TABLE 11A

COMPRESSIVE STRENGTH OF HYDRATING PATCH FORMULATION UTILIZING SILICA FLOUR IN CONJUNCTION WITH HOLLOW BOROSILICATE GLASS BEADS

| | 24 Hour Bench Cubes (PSI) | 8 Day Low Temperature Oven @110 deg F. (PSI) | 14 Day Low Temperature Oven @110 deg F. (PSI) | 28 Day Low Temperature Oven @110 deg F. (PSI) | 28 Day Moist Cure in Baggie (PSI) |
|---|---|---|---|---|---|
| Current Patch Technology (Control 1) | 958 | — | — | 2375 | 900 |
| Formula T | 1317 | 3008 | 3450 | 2900 | 1433 |
| Formula U | 1392 | 2967 | 2892 | 3150 | 1525 |
| Formula V | 1317 | 2833 | 2858 | 2875 | 1275 |

Despite being formulated as a low density composition with high yield, a hydrating patch formulation which comprises a composition of borosilicate glass beads and silica flour is also abrasion resistant, which makes this formulation well suited for patching areas with high traffic and loads, such as for example as flooring. As can be appreciated from Table 11B, these formulations perform well in the abrasion-resistance test as well as in the expansion test.

TABLE 11B

HYDRATING PATCH MATERIALS WITH SILICA FLOUR AND HOLLOW BOROSILICATE GLASS BEADS

| | Formula T | Formula U | Formula V |
|---|---|---|---|
| Normal Consistency: (cc) | 60 | 60 | 58 |
| Patty Size: (in) | 3.72 | 3.75 | 3.88 |
| Test Consistency: (cc) | 50 | 50 | 50 |
| BYK Gardner Abrasion after 100 cycles with BYK 80 grit paper after 24 hrs (grams loss from surface) | 1.08 | 1.21 | 1.17 |
| Wet Density: (#/ft3) | 70.59 | 70.31 | 70.18 |
| Dry Density: (#/ft3) (nearest 1.0#/ft3) | 56 | 56 | 55 |
| Maximum Expansion: (%) | +0.229 | +0.254 | +0.053 |
| Vicat Set: (min) | 22 | 20 | 23 |

Even more unexpectedly, a hydrating patch formulation shows a positive expansion at very low dry densities of 55-56 lbs/ft3. The low density hydrating patch formulation demonstrates a 24-25% increase in the yield. Interestingly, a 50% loading level of a −325 mesh material provides equal to or greater abrasion resistance compared to the −200 mesh silica flour.

Typically, cementitious patch products known in the art have a short pot life which limits the size of the mix which can be used at a time. Once the setting action begins they cannot be rejuvenated, except in some cases by the addition of more water.

The present hydrating patch formulations incorporate a unique combination of rheology modifiers which allow for the re-working or re-tempering of the composition up to 3-4 times and which continues to be useful beyond the otherwise earlier stiffening. This makes the product easier to use, provides for less waste and larger batches can be pre-mixed. These formulations therefore, save time and resources.

Further embodiments include hydrating patch formulations with a plasticizer such as, but not limited to, polycarboxylate ethers which are used in conjunction with other rheology modifiers and provide for unexpectedly unique re-tempering under shear energy as compared to materials commonly used for this purpose. In these embodiments, citric acid or cream of tart can be used in combination with a polycarboxylate ether. As can be appreciated from Table 12, these formulations can be reworked several times.

TABLE 12

HIGH-STRENGTH CEMENTITIOUS PATCH FORMULATION COMPARING CITRIC ACID USAGE VS. CREAM OF TARTAR IN A FORMULA WHICH CAN BE REWORKED 3-4 TIMES AFTER INITIAL MIX

| Component | Citric Acid Formula W Amount (#) | Cream of Tartar Formula X Amount (#) | Cream of Tartar Formula Y Amount (#) |
|---|---|---|---|
| Calcium Aluminate Cement (CAC or HAC or Fondu) | 600 | 600 | 600 |
| Calcium Sulfate Hemi-hydrate (FST NOGO CKS Stucco) | 230 | 230 | 230 |
| Gypsum (Terra Alba) | 85 | 85 | 85 |
| Portland Cement (Class "C") | 175 | 175 | 175 |
| Calcium carbonate | 680 | 680 | 680 |
| Walocel (hydroxyethyl methyl cellulose (HEMC) | 4 | 4 | 4 |
| hydrous magnesium aluminum silicate (Mini-U Gel FG) | 8 | 8 | 8 |
| Lithium carbonate (Ultra Fine) | 4 | 4 | 4 |
| Citric acid | 1.75 | 0 | 0 |
| Cream of Tartar (potassium bitartrate) | 0 | 0.60 | 1.75 |
| Polycarboxylate Ether (Melflux 6681) | 2 | 2 | 2 |
| Defoamer (Vinapor 9010F) | 3 | 3 | 3 |
| Stabilizer premix (Diutan Gum) | 2 | 2 | 2 |
| Ethylene Vinyl Acetate co-polymer (Vinnapas 4021T) | 330 | 330 | 330 |
| Hollow borosilicate glass beads (K37) | 350 | 350 | 350 |
| Aluminum Oxide | 55 | 55 | 55 |
| Ivory Lime | 4.5 | 4.5 | 4.5 |
| TOTAL | 2533.25 | 2532.75 | 2532.5 |

As can be further appreciated from Table 12A, hydrating patch formulations have a longer pot life and can be reworked several times.

TABLE 12A

COMPARING CITRIC ACID USAGE VS. CREAM OF TARTAR IN A HYDRATING PATCH FORMULA WHICH CAN BE REWORKED 3-4 TIMES AFTER INITIAL MIX (BRABENDER VISCOSITY COMPARISON RETEMPERED VS. UNRETEMPERED)

Brabender Viscostiy (BU)
(The lower the BU, the thinner the mix)

| Brabender Time (minutes) | FORMULA W Citric Acid 1.75 lbs/batch 1 part patch to 0.55 parts water by weight | | FORMULA X Cream of Tartar 1.75 lbs/batch 1 part patch to 0.55 parts water by weight | | FORMULA Y Cream of Tartar 0.60 lbs/batch 1 part patch to 0.55 parts water by weight | | Current Patch Technology 1 part patch to 0.55 parts water by weight |
|---|---|---|---|---|---|---|---|
| | Untempered | Retempered | Untempered | Retempered | Untempered | Retempered | Untempered |
| 3 | | | | | | | 560 |
| 5 | 290 | | 240 | | 200 | | |
| 6 | | 320 | | 240 | | 240 | |
| 8 | | 300 | | 250 | | 280 | |
| 10 | 210 | 300 | 160 | 240 | 190 | 280 | |
| 12 | | 290 | | 220 | | 300 | |
| 14 | | 280 | | 260 | | 360 | |
| 15 | 190 | | 180 | | 220 | | |
| 16 | | 260 | | 220 | | 520 | |
| 18 | | 260 | | 260 | | 680 | |
| 20 | 170 | 250 | 200 | 320 | 440 | 1000+ | |
| 22 | | 270 | | 440 | | | |
| 24 | | | | | | | |
| 25 | 160 | 280 | 260 | 600 | 1000+ | | |
| 26 | | 360 | | 980 | | | |
| 28 | | 460 | | 1000+ | | | |
| 30 | 230 | 600 | 540 | 1000+ | | | |
| 32 | | 920 | | 1000+ | | | |
| 34 | | | | | | | |
| 35 | 350 | 1000+ | 1000+ | | | | |
| 36 | | | | | | | |
| 38 | | | | | | | |
| 40 | 1000+ | | | | | | |

Further embodiments provide hydrating patch formulations to which at least one set inhibitor is added. It was unexpectedly determined that combinations of lime/citric acid and/or lime/cream of tartar provide for a more optimal setting time, working time and strength and bond development. A lower viscosity for a hydrating patch formulation can be maintained while retempering the mix 3-4 and even more times depending on the level of citric acid or cream of tartar. This aspect is further demonstrated in Table 12B below. As can be appreciated from Table 12B, the present hydrating patch formulations utilizing the citric acid/lime and cream of tartar/lime combination have higher bond strengths and compressive strengths.

TABLE 12B

HIGH-STRENGTH CEMENTITIOUS PATCH FORMULATION COMPARING CITRIC ACID USAGE VS. CREAM OF TARTAR IN A FORMULA WHICH CAN BE REWORKED 3-4 TIMES AFTER INITIAL MIX (Vicat Set, Compressive Strengths and Bond Strength Comparison)

| | FORMULA W Citric Acid 1.75 lbs/batch 1 parts patch/0.55 part water by weight | FORMULA X Cream of Tartar 0.60 lbs/batch 1 parts patch/0.55 part water by weight | FORMULA X Cream of Tartar 1.75 lbs/batch 1 parts patch/0.55 part water by weight | Current Patch Technology (Control 1) 1 parts patch/0.50 part water by weight |
|---|---|---|---|---|
| Vicat Set: (min) | 38-43 | 26-27 | 36 | 22-24 |
| Compressive Strengths: (PSI) (28 day 110 deg F. Oven) | 4017 | 4254 | 3733 | 2375 |
| Bond Strengths: (PSI) 24 hour | 127 | 100 | 92 | 84 |
| Bond Strengths: (PSI) 48 hour | 119 | 104 | 97 | 92 |

Further comparison of compressive strength at a ratio of 1 part high strength patch to 0.60 parts water is provided in Table 12C below.

TABLE 12C

HIGH-STRENGTH CEMENTITIOUS PATCH FORMULATION COMPARING CITRIC ACID USAGE VS. CREAM OF TARTAR IN A FORMULA WHICH CAN BE REWORKED 3-4 TIMES AFTER INITIAL MIX (Evaluation of higher water on strength vs. current patch technology at lower water)

|  | FORMULA W Citric Acid 1.75 lbs/batch 1 parts patch/0.60 part water by weight | FORMULA X Cream of Tartar 0.60 lbs/batch 1 parts patch/0.60 part water by weight | FORMULA X Cream of Tartar 1.75 lbs/batch 1 parts patch/0.60 part water by weight | Current Patch Technology (Control 1) 1 parts patch/0.50 part water by weight |
|---|---|---|---|---|
| Compressive Strengths: (PSI) (28 day 110 deg F. Oven) | 3061 | 3317 | 3425 | 2375 |

Further embodiments provide hydrating path formulations specifically designed to be used as deep patches. Such deep patches include, but are not limited to, patches of 4 inches and deeper. In these deep patch formulations, a combination of at least two fillers is used. These fillers are selected from the group consisting of perlite, coated perlite, siloxane-coated perlite, sand, borosilicate glass beads and silica flour. At least in some embodiments, the combination for the filler is sand and siloxane-coated perlite. Suitable deep patch formulations include those listed in Table 13 below.

TABLE 13

HYDRATING PATCH FORMULATION FOR DEEP-FILL APPLICATIONS

| Component | Deep Fill Patch Formula Z Amount (lbs) |
|---|---|
| Calcium Aluminate Cement (CAC or HAC or Fondu) | 752 |
| Calcium Sulfate Hemi-hydrate (FST NOGO CKS Stucco) | 260 |
| Gypsum (Terra Alba) | 85 |
| Portland Cement (Class "C") | 130 |
| Calcium carbonate | 600 |
| Walocel MK 30000PF (hydroxyethyl methyl cellulose (HEMC) | 4 |
| Hydrous magnesium aluminum silicate (Mini-U Gel FG) | 8 |
| Lithium carbonate (Ultra Fine) | 4 |
| Citric acid | 2.50 |
| Polycarboxylate Ether (Melflux 6681) | 5 |
| Defoamer (Vinapor 9010F) | 3 |
| Defoamer (foamaster CN) | 4 |
| Ethylene Vinyl Acetate co-polymer (Vinnapas 4021T) | 200 |
| Treated Perlite (35/34 perlite) | 50 |
| Sand (Oklahoma Sand) | 1850 |
| TOTAL | 3957.50 |

Further properties of a deep fill formulation include those listed in Table 13A below.

TABLE 13A

PHYSICAL PROPERTIES OF DEEP FILL FORMULATION (Compressive Strength at 20 cc mix design)

|  | 24 Hour Bench Cubes (PSI) | 8 Day Low Temperature Oven @110 deg F. (PSI) | 14 Day Low Temperature Oven @110 deg F. (PSI) | 28 Day Low Temperature Oven @110 deg F. (PSI) | 28 Day Moist Cure in Baggie (PSI) |
|---|---|---|---|---|---|
| Formula Z 20 cc | 3558 | 6025 | 6358 | 7450 | 5083 |

This invention will be explained in more detail below by the way of the following non-limiting examples.

EXAMPLE 1

Yield Comparison

A hydrating patch formulation was prepared as listed in Table 2A Control patches 1 and 2 were prepared as well as shown in Table 2A. The same weight of each patch was weighed out and then mixed with the recommended amount of water and troweled down between standard 0.38" keystock with a controlled width of 2.94". The resultant length of troweled product represents the difference in yield at a defined thickness and width and is reported in Table A below.

TABLE A

| Patch Description | BAR LENGTH (in) | % Greater Coverage of Described Invention |
|---|---|---|
| High Strength Patch Invention | 15.50" | n/a |
| Current Technology Patch (Control 1) at 50 cc | 11" | 41 |
| Current Technology Patch (Control 2) at 25 cc | 10.25" | 51 |

EXAMPLE 2

Hydrating Patch Formulation with Long Shelf Life

A hydrating patch formulation was prepared according to formula G, but without hollow borosilicate glass beads added to it. The formulation has an excellent shelf life and can be used in combination with hollow borosilicate glass beads or any other filler disclosed above.

TABLE B

HIGH-STRENGTH CEMENTITIOUS PATCH PREMIX (FORMULA G)

| Formula G: Components | Amount (lbs) | Amount (%) |
|---|---|---|
| Calcium Aluminate Cement (CAC or HAC) | 1320 | 32.19 |
| Calcium Sulfate Hemi-hydrate (FST NOGO CKS Stucco) | 460 | 11.22 |
| Gypsum | 150 | 3.66 |
| Class C cement | 230 | 5.61 |
| Calcium carbonate | 1050 | 25.60 |
| Walocel (hydroxyethyl methyl cellulose (HEMC) | 7 | 0.17 |
| Mini-U Gel FG (hydrous magnesium aluminum silicate) | 14 | 0.34 |
| Lithium carbonate | 7 | 0.17 |
| Citric acid | 1 | 0.02 |
| Polycarboxylate Ether (Melflux 6681) | 3.5 | 0.09 |
| Vinapor 9010F (defoamer) | 5 | 0.12 |
| Stabilizer premix | 3.5 | 0.09 |
| Ethylene Vinyl Acetate co-polymer (Vinnapas 4021T) | 750 | 18.29 |
| Aluminum Oxide (white) | 100 | 2.44 |
| Glass beads (K-37 beads) | 0 | 0 |
| TOTAL | 4101.50 | 100.01 |

What is claimed is:

1. A hydrating patch composition for patching walls, flooring and ceiling, the composition comprising:
    Portland cement in the amount from 2% to 10%,
    Calcium Sulfate Hemihydrate in the amount from 2% to 30%,
    Gypsum in the amount from 0% to 15%,
    Calcium Aluminate Cement in the amount from 15% to 40%,
    Calcium Carbonate in the amount from 0% to 40%,
    a filler in the amount from 1% to 30%, wherein the filler is a combination of hollow borosilicate glass beads and lime; and
    a binder in the amount from 10% to 40%, wherein the binder is selected from the group consisting of polyacrylates, polyacetates, polyvinyl-acetates, and any combination thereof;
    wherein all amounts are based on dry weight of the composition.

2. The hydrating patch composition of claim 1, wherein calcium sulfate hemihydrate is calcined synthetic gypsum spray-coated with diethylene-triamine-pentaacetic acid (DTPA).

3. The hydrating patch composition of claim 1 wherein the hollow borosilicate glass beads have a crush strength from 250 to 6,000 psi.

4. The hydrating patch composition of claim 1, wherein the hydrating patch composition comprises at least one abrasive agent in the amount from 0.05% to 60% and wherein the abrasive agent is selected from the group consisting of: aluminum oxide brown, aluminum oxide white, garnet dust, stardust, copper slag, silica flour and combinations thereof.

5. The hydrating patch composition of claim 1, wherein the lime is used in the amount from 0.0625% to 10% of the dry weight of hollow borosilicate glass beads.

6. The hydrating patch composition of claim 1, wherein the hydrating patch composition further comprises a compound selected from the group consisting of: at least one abrasive agent, at least one rheological modifier, at least one set retarder and any composition thereof.

7. The hydrating patch composition of claim 1, wherein the hydrating patch composition comprises at least one compound selected from the group consisting of hydroxyethyl methyl cellulose, magnesium aluminum silicate, diutan gum and any combination thereof.

8. The hydrating patch composition of claim 4, wherein the hollow borosilicate glass beads have a crush strength from 250 to 6,000 psi and wherein the hydrating patch composition comprises silica flour and the ratio between the hollow borosilicate glass beads and the silica flour is from 1:1 to 3:1.

9. The hydrating patch composition of claim 1, wherein the hydrating patch composition comprises at least one rheological modifier in the amount from 0.05% to 10% by dry weight of the composition, and wherein the rheological modifier is selected from the group consisting of magnesium aluminum silicate, polycarboxylate, clay and stabilizers.

10. The hydrating patch composition of claim 1, wherein the composition further comprises at least one compound selected from the group consisting of polycarboxylate ether, citric acid, cream of tartar or a combination thereof.

* * * * *